US012789241B2

(12) United States Patent
Zhuo et al.

(10) Patent No.: US 12,789,241 B2
(45) Date of Patent: Nov. 10, 2026

(54) CONVEYING ROLLER CLEANING DEVICE AND MATERIAL TAPE CONVEYING EQUIPMENT

(71) Applicant: CONTEMPORARY AMPEREX TECHNOLOGY (HONG KONG) LIMITED, Hong Kong (CN)

(72) Inventors: Xuesong Zhuo, Ningde (CN); Lei Zhang, Ningde (CN); Yanhuang Fan, Ningde (CN); Hongfeng Yang, Ningde (CN); Qi Zhang, Ningde (CN); Zilei Wang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 56 days.

(21) Appl. No.: 18/811,828

(22) Filed: Aug. 22, 2024

(65) Prior Publication Data

US 2024/0408652 A1 Dec. 12, 2024

Related U.S. Application Data

(63) Continuation of application No. PCT/CN2022/112526, filed on Aug. 15, 2022.

(51) Int. Cl.
*B08B 7/00* (2006.01)
*B65G 45/10* (2006.01)
*B65H 18/10* (2006.01)

(52) U.S. Cl.
CPC ......... *B08B 7/0028* (2013.01); *B65H 18/103* (2013.01); *B65G 45/10* (2013.01); *B65H 2301/531* (2013.01); *B65H 2701/3772* (2013.01)

(58) Field of Classification Search
CPC ................. B08B 7/0028; B65G 45/10; B65G 2301/531; B41F 21/00; B65H 2301/531; B65H 18/103
(Continued)

(56) References Cited

U.S. PATENT DOCUMENTS

| | | | |
|---|---|---|---|
| 5,718,959 | A | 2/1998 | Wieloch et al. |
| 2010/0071722 | A1 | 3/2010 | Nakagame |
| 2017/0239695 | A1 | 8/2017 | Hamilton |

FOREIGN PATENT DOCUMENTS

| | | | | | |
|---|---|---|---|---|---|
| CN | 1172730 | A | | 2/1998 | |
| CN | 108238483 | A | * | 7/2018 | ............ B65H 37/04 |

(Continued)

OTHER PUBLICATIONS

Extended European Search Report issued Jul. 7, 2025 in European Patent Application No. 22955221.1.

(Continued)

*Primary Examiner* — Laura C Guidotti
(74) *Attorney, Agent, or Firm* — XSENSUS LLP

(57) ABSTRACT

The present disclosure provides a conveying roller cleaning method, a conveying roller cleaning device, and a material tape conveying equipment. In the conveying roller cleaning method, the conveying roller is configured to convey a material tape, and the cleaning method includes: connecting a head end of an adhesive tape with a tail end of the material tape; and the material tape pulling the adhesive tape to move so as to make the adhesive tape pass through the conveying roller and remove impurities from a surface of the conveying roller. The conveying roller cleaning method can clean the conveying roller.

9 Claims, 4 Drawing Sheets

(58) Field of Classification Search
USPC .............................................. 15/97.1, 256.51
See application file for complete search history.

(56) References Cited

FOREIGN PATENT DOCUMENTS

| | | | | | |
|---|---|---|---|---|---|
| CN | 208178017 | U | | 12/2018 | |
| CN | 213444823 | U | | 6/2021 | |
| CN | 217120971 | U | | 8/2022 | |
| DE | 10 2005 051763 | A1 | | 5/2007 | |
| EP | 0816077 | A1 | | 1/1998 | |
| JP | S63-8136 | A | | 1/1988 | |
| JP | 2001-338442 | A | | 12/2001 | |
| JP | 2007-229610 | A | | 9/2007 | |
| JP | 2013-028409 | A | | 2/2013 | |
| WO | WO 2008/041445 | A1 | * | 4/2008 | .......... H10P 72/0442 |
| WO | WO 2018/216949 | A1 | * | 11/2018 | ............. G06F 3/041 |

OTHER PUBLICATIONS

Office Action issued Mar. 8, 2025 in Chinese Patent Application No. 202280091856.7 with English translation thereof.

International Search Report and Written Opinion mailed on Apr. 28, 2023, received for International Application No. PCT/CN2022/112526, filed on Aug. 15, 2022, 16 pages including English Translation.

* cited by examiner

CONVEYING ROLLER CLEANING DEVICE AND MATERIAL TAPE CONVEYING EQUIPMENT

CROSS-REFERENCE TO RELATED APPLICATION

The present application is a continuation of International Application No. PCT/CN2022/112526, filed on Aug. 15, 2022, which is incorporated herein by reference in its entirety.

TECHNICAL FIELD

The present disclosure relates to the field of battery production equipment, and specifically to a conveying roller cleaning method, a conveying roller cleaning device, and a material tape conveying equipment.

BACKGROUND ART

Energy conservation and emission reduction are key to the sustainable development of the automotive industry, and electric vehicles have become an important component of the sustainable development of the automotive industry due to their advantages in energy conservation and environmental protection. For electric vehicles, battery technology is an important factor related to their development.

In the battery production process, flexible material tapes such as electrode plates are usually transported by using roller conveyor equipment. After the use of roller conveyor equipment, the surface of its rollers may be contaminated with some impurities, which may cause damage to the material tape. Therefore, how to ensure the cleanliness of the roller surface of the roller conveyor equipment is an urgent technical problem to be solved.

SUMMARY

The embodiments of the present disclosure provide a conveying roller cleaning method, a conveying roller cleaning device, and a material tape conveying equipment, which can clean the conveying roller through the conveying roller cleaning method.

In the first aspect, the embodiments of the present disclosure provide a conveying roller cleaning method, wherein the conveying roller is configured to convey a material tape, and the cleaning method includes: connecting a head end of an adhesive tape with a tail end of the material tape; and the material tape pulling the adhesive tape to move so as to make the adhesive tape pass through the conveying roller and remove impurities from a surface of the conveying roller.

In the above technical solution, the material tape plays a traction role, thereby allowing the adhesive tape to pass through each conveying roller in sequence. When the adhesive tape is in contact with the conveying roller, the adhesive tape first adheres to the conveying roller. As the adhesive tape continues to move, the adhesion position between the adhesive tape and the conveying roller gradually separates. Since the adhesion force of the adhesive tape to impurities is larger than that of the conveying roller to impurities, impurities adhering to the surface of the conveying roller are carried away by the adhesive tape, thereby achieving the purpose of cleaning the surface of the conveying roller.

In some embodiments of the first aspect of the present disclosure, the cleaning method further includes removing the release film from the adhesive tape and winding the release film before connecting the head end of the adhesive tape to the tail end of the material tape.

In the above technical solution, after the release film is removed from the adhesive tape, if it is not stored, the release film will be scattered everywhere, which increases the subsequent work burden, reduces work efficiency, and may be wound in other equipment to create safety hazards. Therefore, the release film is rolled up to facilitate subsequent cleaning.

In some embodiments of the first aspect of the present disclosure, the adhesive tape is double-sided adhesive tape.

In the above technical solution, only one face of the single-sided adhesive tape is sticky, and the cleaning range is limited. Both sides of the double-sided adhesive tape are sticky, thereby allowing the conveying rollers in contact with both sides of the double-sided adhesive tape to be cleaned, and improving the cleaning range and thus improving cleaning efficiency.

In some embodiments of the first aspect of the present disclosure, the glue applying amount per unit area on each face of the double-sided adhesive tape is 5-7 $g/m^2$.

In the above technical solution, if the adhesive layer of the double-sided adhesive tape is applied with too much glue, it will cause excessive resistance during the material tape pulling the double-sided adhesive tape to move, which increases the energy consumption of the device operation. On the other hand, if the double-sided adhesive tape or material tape is subjected to too much force, it may be broken. If the amount of glue applied to the adhesive layer of double-sided adhesive tape is too small, it will cause the adhesion force of the double-sided adhesive tape to be too small, which reduces the adhesion effect to impurities and thus reduces the cleaning effect.

In some embodiments of the first aspect of the present disclosure, the glue of the adhesive tape is acrylic adhesive.

In the above technical solutions, acrylic adhesive has the advantage of high elongation, thereby reducing the risk of breakage of the adhesive tape, and also has the advantage of strong adhesion, thereby improving the cleaning effect of the adhesive tape.

In some embodiments of the first aspect of the present disclosure, the substrate material of the adhesive tape is polypropylene.

In the above technical solution, polypropylene substrate has the advantages of high strength, good stretchability, and resistance to bending fatigue, thereby reducing the risk of breakage of the adhesive tape. Additionally, polypropylene substrate has the advantage of light weight, thereby reducing the resistance during the movement of the adhesive tape.

In some embodiments of the first aspect of the present disclosure, the release film is made of polyethylene terephthalate.

In the above technical solution, polyethylene terephthalate material has low permeability for materials such as gas, water, and oil, which can protect the adhesive layer of the adhesive tape.

In the second aspect, the embodiments of the present disclosure also provide a conveying roller cleaning device, which includes a support, an unwinding reel, and a winding reel, wherein the unwinding reel is rotatably arranged on the support and is configured to unwind the adhesive tape wound on the unwinding reel; the winding reel is rotatably arranged on the support and is configured to wind the release film separated from the adhesive tape; and the unwinding reel and the winding reel are provided parallel to each other.

In the above technical solution, for the convenience of storage and transportation, the adhesive tape is usually wound into a cylindrical adhesive tape roll. The adhesive tape roll is arranged on the unwinding reel, and under the action of the traction force of the material tape, the adhesive tape roll rotates and unwinds the adhesive tape successively for easy use. When using the adhesive tape, it is necessary to remove the release film. To prevent the release film from scattering, polluting the production environment, or resulting in safety hazards, the removed release film is wound around the winding reel for easy cleaning and recycling, which can reduce costs and protect the environment.

In some embodiments of the second aspect of the present disclosure, the conveying roller cleaning device further includes a transmission mechanism, connecting an unwinding reel and a winding reel.

In the above solution, the unwinding reel and the winding reel can rotate under the action of the transmission mechanism, that is, while the unwinding reel continuously unwinds the adhesive tape, the winding reel can continuously wind the release film, thereby improving cleaning efficiency. Furthermore, both the winding reel and the unwinding reel are driven by a transmission mechanism to simplify the structure of the cleaning device and improve reliability of the cleaning device.

In some embodiments of the second aspect of the present disclosure, the transmission mechanism includes: a first belt pulley, a second belt pulley, and a conveyor belt, wherein the first belt pulley is connected to the unwinding reel; the second belt pulley is connected to the winding reel, and the diameter of the first belt pulley is greater than that of the second belt pulley; and the conveyor belt is wound around the outer peripheral surfaces of the first belt pulley and the second belt pulley.

In the above solution, the conveyor belt enables the torque between the first belt pulley and the second belt pulley to be transmitted to each other, that is, when driving either of the first belt pulley and the second belt pulley to rotate, the other can rotate synchronously. Therefore, the transmission connection between the unwinding reel and the winding reel can be achieved. Furthermore, since the conveyor belt transmits power through friction, when the transmission mechanism experiences overload, relative sliding occurs between the conveyor belt and two belt pulleys, thereby providing overload protection.

In some embodiments of the second aspect of the present disclosure, the conveying roller cleaning device further includes an operating part, which is arranged at one end of the winding reel to drive the winding reel to rotate.

In the above solution, the operating part drives the winding reel to rotate, so as to provide power for the winding reel.

In some embodiments of the second aspect of the present disclosure, the conveying roller cleaning device further includes a damper, and the unwinding reel is rotatably connected to the support through the damper.

In the above solution, on the one hand, the damper prevents the adhesive tape roll from rotating too fast under the action of inertia during the unwinding process, which results in excessive unwinding of the adhesive tape; and on the other hand, damper enables the unwinded adhesive tape to be tightened, thereby making it easier to guide the adhesive tape.

In some embodiments of the second aspect of the present disclosure, the conveying roller cleaning device further includes a guide roller, which is rotatably arranged on a support to change the direction of movement of the adhesive tape, and the guide roller is parallel to the unwinding reel.

In the above solution, the guide roller can guide the unwinded adhesive tape, thereby allowing it to move along the set trajectory. Furthermore, due to the parallel arrangement between the guide roller and the unwinding reel, the adhesive tape can be in a flat state during movement.

In some embodiments of the second aspect of the present disclosure, the unwinding reel is located between the guide roller and the winding reel.

In the above solution, as the unwinding reel is located between the guide roller and the winding reel, during the unwinding process of the adhesive tape, the adhesive tape moves towards the guide roller and the release film moves towards the winding roller, so that the movement paths of the adhesive tape and release film do not intersect, thereby avoiding interference between the adhesive tape and release film.

In the third aspect, the embodiment of the present disclosure also provides a material tape conveying equipment, including a tape connecting platform, a conveying roller cleaning device in the above embodiment, and multiple conveying rollers, wherein the multiple conveying rollers are configured to convey the material tape; the tape connecting platform is configured to achieve the connection between two segments of the material tape, wherein along the conveying direction of the material tape, the tape connecting platform is arranged upstream of the multiple conveying rollers; and the conveying roller cleaning device is provided on the tape connecting platform.

In the above solution, multiple conveying rollers form a conveying route to achieve the purpose of conveying the material tape. The tape connecting platform can be used to connect different segments of the material tape, and also can be used to connect the material tape with the adhesive tape, thereby enabling the material tape conveying equipment to switch between conveying condition and cleaning condition.

In some embodiments of the third aspect of the present disclosure, the material tape conveying equipment further includes an unwinding mechanism and a winding mechanism, wherein the unwinding mechanism is configured to unwind the material tape and the winding mechanism is configured to wind the material tape, wherein along the conveying direction of the material tape, the winding mechanism is arranged downstream of the unwinding mechanism, and the tape connecting platform and multiple conveying rollers are provided between the unwinding mechanism and the winding mechanism.

In the above solution, the unwinding mechanism is used for winding the material tape to be conveyed, and the winding mechanism is used for winding the material tape after being conveyed. The winding mechanism provides the power to pull the material tape to move, thereby allowing the material tape to pull the adhesive tape to move.

BRIEF DESCRIPTION OF DRAWINGS

In order to more clearly illustrate technical solutions of embodiments of the present disclosure, drawings required for use in the embodiments will be described briefly below. It should be understood that the following drawings are merely illustrative of some embodiments of the present disclosure, which therefore should not be understood as a limitation to the scope.

Figure 1:
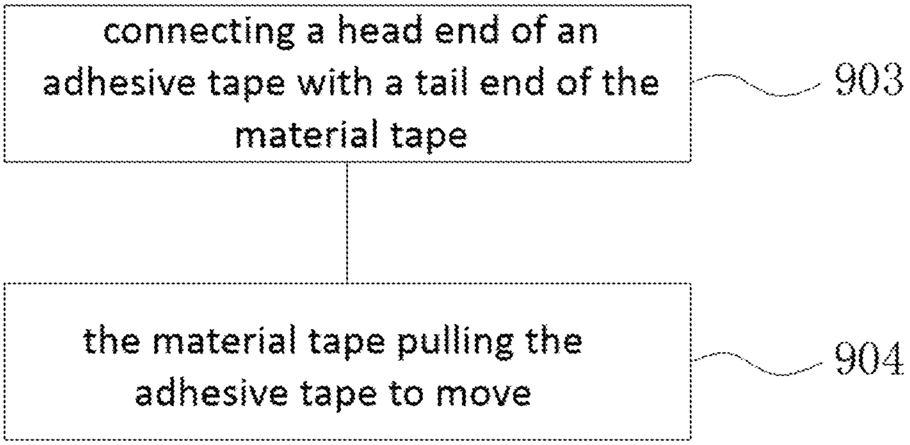
FIG. 1 is a partial flowchart schematic view of the conveying roller cleaning method provided in some embodiments of the present disclosure.

Reference signs: 100—material tape conveying equipment; 10—unwinding mechanism; 20—conveying roller; 30—conveying roller cleaning device; 301—winding reel; 302—unwinding reel; 303—guide roller; 304—damper; 305—transmission mechanism; 3051—first belt pulley; 3052—second belt pulley; 3053—conveyor belt; 306—operating part; 307—support; 308—clamping block; 309—limit ring; 40—tape connecting platform; 401—support surface; 402—first pressing rod; 403—second pressing rod; 404—cutting seam; 50—cutting device; 60—winding mechanism; 70—material tape; 80—adhesive tape; 801—adhesive layer; 802—substrate; 803—release film.

DETAILED DESCRIPTION OF EMBODIMENTS

In order to make the objectives, technical solutions and advantages of the embodiments of the present disclosure clearer, the technical solutions in the embodiments of the present disclosure will be described clearly in detail below with reference to the drawings in the embodiments of the present disclosure. Obviously, the embodiments described are some of, rather than all of, the embodiments of the present disclosure. The components of the embodiments of the present disclosure, typically described and shown in the drawings herein, can be arranged and designed in various different configurations.

Therefore, the following detailed description of the embodiments of the present disclosure provided in the drawings is not intended to limit the scope of the present disclosure, but only to represent the selected embodiments of the present disclosure.

It should be noted that in the absence of conflicts, the embodiments and the features in the embodiments in the present disclosure can be combined with each other.

It should be noted that similar reference signs and letters represent similar terms in the following drawings, so once an item is defined in one figure, further definition and explanation are not required in subsequent figures.

In the description of embodiments of the present disclosure, it should be noted that the orientation or positional relationship indicated are based on the orientation or positional relationship shown in the drawings, or the orientation or positional relationship in which the product is usually placed in use, or the orientation or positional relationship commonly understood by the skilled person in the art, and it is only for facilitating describing the present disclosure and simplifying the description, rather than indicating or implying that the related apparatus or element must be in a specific orientation, or constructed or operated in a specific orientation, and therefore it cannot be understood as a limitation to the present disclosure. In addition, terms such as "first", "second", and "third" are only used to distinguish descriptions, and cannot be understood as indicating or implying relative importance.

A material tape refers to a soft and elongated raw material, and in the battery production process, electrode plate is a typical material for material tape.

The roller conveyor equipment usually includes multiple conveying rollers, and the material tape is pulled to the destination through the outer peripheral surface of each conveying roller in sequence. These conveying rollers play a role in limiting the conveying route of the material tape and supporting the material tape to make the material tape maintain a certain tension.

In the actual production process, there are various reasons that can lead to impurities adhered on the conveying roller. For example, dust in the air settles onto the conveying roller, which is adsorbed on the surface of the conveying roller under the action of static electricity; when conveying the material tape, impurities adhering to the material tape adhere to the conveying roller when passing through the conveying roller; and the conveying roller generates small metal debris when subjected to friction from the material tape or other objects.

Most of these impurities are hard objects, and some of them also have conductivity. These impurities have many hazards in the production process, for example, hard impurities may puncture the material tape and damage the structure of the material tape; and when transporting the electrode plate, the metal impurities may puncture the electrode plate, which may also lead to a short circuit risk in the produced battery. Therefore, cleaning the conveying rollers of the roller conveyor equipment is a very necessary production process.

The traditional cleaning method is to wipe the conveying roller with cleaning components, which can remove some impurities. However, the friction of the cleaning components on the conveying roller will cause the conveying roller to produce the metal debris to reattach to the conveying roller, which cannot fundamentally solve the problem.

Based on the above considerations, in order to achieve the purpose of cleaning the conveying roller, the inventor has conducted in-depth research and designed a conveying roller cleaning method. This cleaning method involves pulling the adhesive tape through each conveying roller in sequence, so as to cause the outer peripheral surface of the conveying roller to come into contact with the adhesive tape. Under the adhesive force of the adhesive tape, impurities adhering to the conveying roller are taken away by the adhesive tape, and at the same time, new impurities generated by friction can be avoided from adhering to the conveying roller.

Referring to FIG. 1, FIG. 1 is a partial flowchart schematic view of the conveying roller cleaning method provided in some embodiments of the present disclosure. The embodiments of the present disclosure provide a conveying roller cleaning method, wherein the conveying roller 20 is configured to convey a material tape 70, and the cleaning method includes: 903, connecting a head end of an adhesive tape 80 with a tail end of the material tape 70; and 904, the material tape 70 pulling the adhesive tape 80 to move so as to make the adhesive tape 80 pass through the conveying roller 20 and remove impurities from a surface of the conveying roller 20.

The material tape 70 pulls the adhesive tape 80 to move, so that the adhesive tape 80 passes through the conveying roller 20, which means that the material tape 70 provides the power to move the adhesive tape 80. Under the action of the traction force of the material tape 70, the adhesive tape 80 moves along the conveyor line formed by the conveying roller 20 and sequentially contacts the outer peripheral surface of each conveying roller 20.

The removal of impurities refers to the fact that the adhesive force of adhesive tape 80 on impurities is greater than that of conveying roller 20 on impurities. Therefore, when adhesive tape 80 passes through conveying roller 20, impurities on conveying roller 20 adhere to adhesive tape 80 and are taken away by the adhesive tape 80.

Optionally, the head end of adhesive tape 80 is bonded to the tail end of material tape 70 to connect adhesive tape 80 to material tape 70. Additionally, the bonding between adhesive tape 80 and material tape 70 ensures that the connection between the two is flat, straight and free from protrusions, thereby ensuring the smoothness when the material tape 70 pulls the adhesive tape 80 to move.

The connection process between adhesive tape 80 and material tape 70 should be completed before the tail end of material tape 70 passes through conveying roller 20. When there are multiple conveying rollers 20, the connection process should be completed before the tail end of material tape 70 passes through the first conveying roller 20 to ensure that all conveying rollers 20 can be cleaned.

Firstly, the material tape 70 plays a traction role, thereby allowing the adhesive tape 80 to pass through each conveying roller 20 in sequence. When the adhesive tape 80 is in contact with the conveying roller 20, the adhesive tape 80 adheres to the conveying roller 20. As the adhesive tape 80 continues to move, the adhesion position between the adhesive tape 80 and the conveying roller 20 gradually separates. Since the adhesion force of the adhesive tape 80 to impurities is larger than that of the conveying roller 20 to impurities, impurities adhering to the surface of the conveying roller 20 are carried away by the adhesive tape 80, thereby achieving the purpose of cleaning the surface of the conveying roller 20.

Secondly, on the one hand, the cleaning effect of adhesive tape 80 mainly relies on adhesive force rather than friction force, which does not require friction with the conveying roller 20 to achieve the purpose of cleaning. On the other hand, although there is a trend of generating friction by relative movement between the adhesive tape 80 and the conveying roller 20 when the adhesive tape 80 passes through the conveying roller 20, under the action of the adhesive force of adhesive tape 80, there is static friction between adhesive tape 80 and conveying roller 20, and no relative sliding occurs. Therefore, no new debris will be generated due to friction. Even if there is relative sliding between adhesive tape 80 and conveying roller 20, due to the soft texture of the glue layer of adhesive tape 80, it will not rub the conveying roller 20 to make it produce debris. In summary, adhesive tape 80 not only plays a cleaning role but also avoids the generation of new impurities due to friction.

Furthermore, in some cases, the conveyor line of material tape 70 is longer, resulting in a larger number of conveying rollers 20. Cleaning each conveying roller 20 one by one is inefficient. By pulling adhesive tape 80 through each conveying roller 20, multiple conveying rollers 20 can be cleaned simultaneously, thereby improving cleaning efficiency. Due to the need for reasonable utilization of space, in the production environment, the space between equipment and equipment is limited, which makes it difficult for some conveying rollers 20 to be cleaned. Cleaning with adhesive tape 80 takes up less space and can complete the cleaning process in a narrow space. Moreover, there is no need to additionally install cleaning equipment in the material tape conveying equipment 100, thereby saving space and reducing costs.

Figure 2:
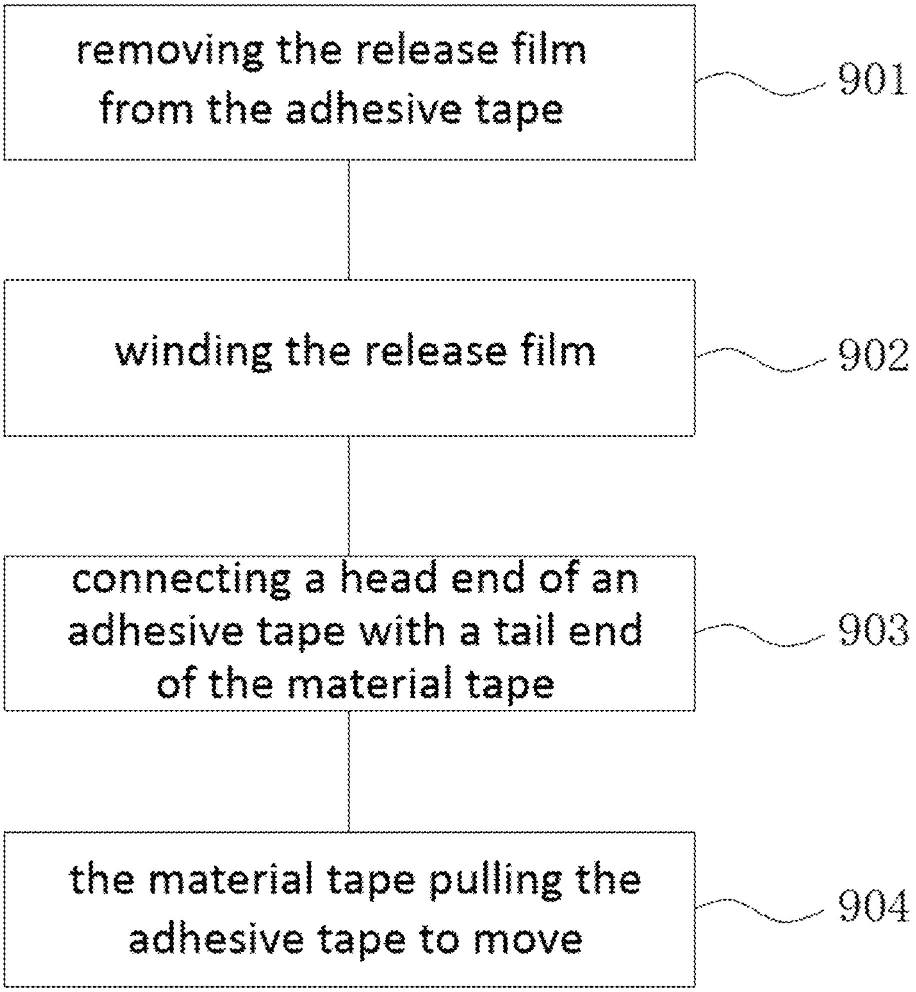
FIG. 2 is a overall flowchart schematic view of the conveying roller cleaning method provided in some embodiments of the present disclosure.

Referring to FIG. 2, FIG. 2 is a overall flowchart schematic view of the conveying roller cleaning method provided in some embodiments of the present disclosure. In some embodiments, the cleaning method further includes: 901, removing the release film 803 from the adhesive tape 80; and 902, winding the release film 803 before connecting the head end of the adhesive tape 80 to the tail end of the material tape 70.

The release film 803 is an isolation film covering the adhesive layer of adhesive tape 80, which separates the adhesive layer of adhesive tape 80 from the outside and plays a role in preventing glue evaporation.

Before using the adhesive tape 80, the release film 803 is removed to expose the adhesive layer 801 of adhesive tape 80, so that when the adhesive tape 80 comes into contact with the conveying roller 20, it can adhere to the conveying roller 20.

After the release film 803 is removed from the adhesive tape 80, if it is not stored, the release film 803 will be scattered everywhere, which increases the subsequent work burden, reduces work efficiency, and may be wound in other equipment to create safety hazards. Therefore, the release film 803 is rolled up to facilitate subsequent cleaning.

It should be noted that in the above three steps of removing release film 803, winding release film 803, and connecting the head end of adhesive tape 80 to the tail end of material tape 70, there is no strict sequence. For example, the user can first remove the release film 803, then connect the head end of adhesive tape 80 to the tail end of material tape 70, and then roll up the release film 803. The user can also remove the release film 803 first, roll up the release film 803, and then connect the head end of adhesive tape 80 to the tail end of material tape 70.

Figure 3:
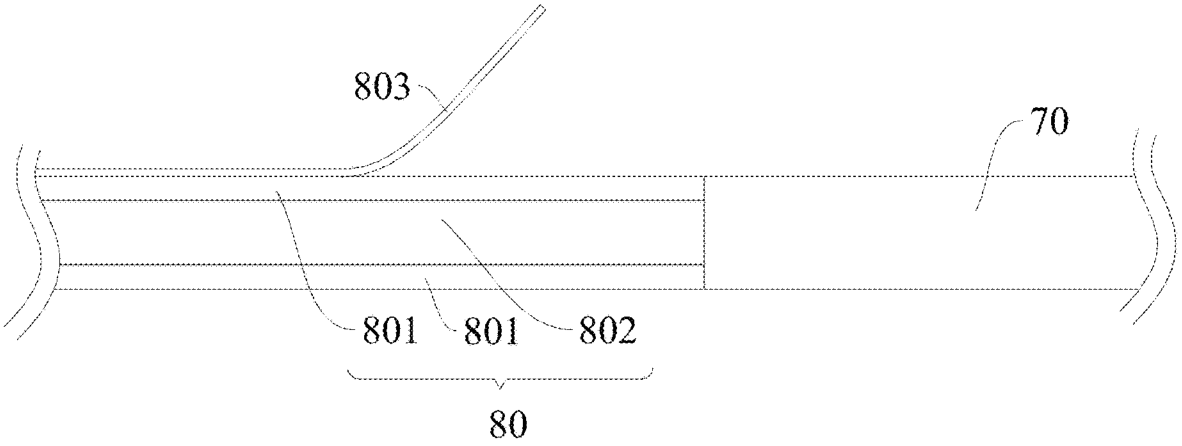
FIG. 3 is a schematic view of connection between the material tape and the adhesive tape provided in some embodiments of the present disclosure.

Referring to FIG. 3, FIG. 3 is a schematic view of connection between the material tape 70 and the adhesive tape 80 provided in some embodiments of the present disclosure. In some embodiments, the adhesive tape 80 is double-sided adhesive tape.

When adhesive tape 80 is moved under the traction of material tape 70, it is not the case that only one side maintains contact with the conveying roller 20. For example, during the movement of adhesive tape 80, there may be situation where it needs to be turned. When adhesive tape 80 turns towards different sides, the contact surface between adhesive tape 80 and conveying roller 20 is also different. Furthermore, the conveying rollers 20 are not limited to be arranged at intervals along a single route. For example, in order to shape the material tape 70, two conveying rollers 20 can be arranged at intervals, and the material tape 70 passes between two conveying rollers 20, such that the conveying roller 20 can flatten the material tape 70. In this case, when adhesive tape 80 passes between two conveying rollers 20, each side of adhesive tape 80 will come into contact with one conveying roller 20.

If only one side of adhesive tape 80 is sticky and thus has poor adaptability, it is not possible to clean all conveying rollers 20, and the cleaning range is limited. However, both sides of the double-sided adhesive tape are sticky, thereby allowing the conveying rollers 20 in contact with both sides of the double-sided adhesive tape to be cleaned, and improving the cleaning range and thus improving cleaning efficiency.

In some embodiments, the glue applying amount per unit area on each face of the double-sided adhesive tape is 5-7 $g/m^2$.

The glue applying amount per unit area on each face of the double-sided adhesive tape refers to the two surfaces with a larger area in the thickness direction of the double-sided adhesive tape, which are used to be in contact with different conveying rollers 20.

Under certain parameters such as the type of glue, the substrate material of the double-sided adhesive tape, and the size of the double-sided adhesive tape, the adhesion force of the double-sided adhesive tape depends on the glue applying amount. The larger the glue applying amount is, the greater the adhesion force of the double-sided adhesive tape is.

If the adhesive layer 801 of the double-sided adhesive tape is applied with too much glue, it will cause excessive resistance during the material tape 70 pulling the double-sided adhesive tape to move, which increases the energy consumption of the device operation. On the other hand, if the double-sided adhesive tape or material tape 70 is subjected to too much force, it may be broken. If the amount of glue applied to the adhesive layer 801 of double-sided adhesive tape is too small, it will cause the adhesion force of the double-sided adhesive tape to be too small, which reduces the adhesion effect to impurities and thus reduces the cleaning effect.

For example, in this embodiment, when the glue applying amount is less than 5 $g/m^2$, the adhesion force of the double-sided adhesive tape is insufficient. When the double-sided adhesive tape adheres to the conveying roller 20, the adhesion force of conveying roller 20 to impurities is greater than that of the double-sided adhesive tape to impurities, such that when the double-sided adhesive tape and conveying roller 20 are separated, impurities cannot adhere to the double-sided adhesive tape, thereby reducing the cleaning effect. When the amount of glue applied is greater than 7 $g/m^2$, the adhesion force between the double-sided adhesive tape and the conveying roller 20 is too large, and the corresponding force required to pull the double-sided adhesive tape to move is also greater, thereby increasing the risk of breakage of the double-sided adhesive tape.

In some embodiments, the glue of the adhesive tape 80 is acrylic adhesive.

The acrylic adhesive has the advantage of high elongation, thereby reducing the risk of breakage of the adhesive tape 80, and also has the advantage of strong adhesion, thereby improving the cleaning effect of the adhesive tape 80.

Please continue to refer to FIG. 3. In some embodiments, the substrate 802 of the adhesive tape 80 is made of polypropylene.

Since the adhesive tape 80 is subjected to tensile force during traction by the material tape 70, there is a risk that the adhesive tape 80 may be broken if the adhesive tape 80 is not strong enough.

The polypropylene substrate 802 has the advantages of high strength, good stretchability, and resistance to bending fatigue, thereby reducing the risk of breakage of the adhesive tape 80. Moreover, the polypropylene substrate 802 has the advantage of light weight, thereby reducing the resistance during the movement of the adhesive tape 80.

In some embodiments, the release film 803 is made of polyethylene terephthalate.

The adhesive layer 801 of adhesive tape 80 refers to the glue layer formed by applying glue on adhesive tape 80, and the release film 803 covers the adhesive layer 801.

The polyethylene terephthalate material has low permeability for materials such as gas, water, and oil, which can protect the adhesive layer 801 of the adhesive tape 80.

Figure 4:
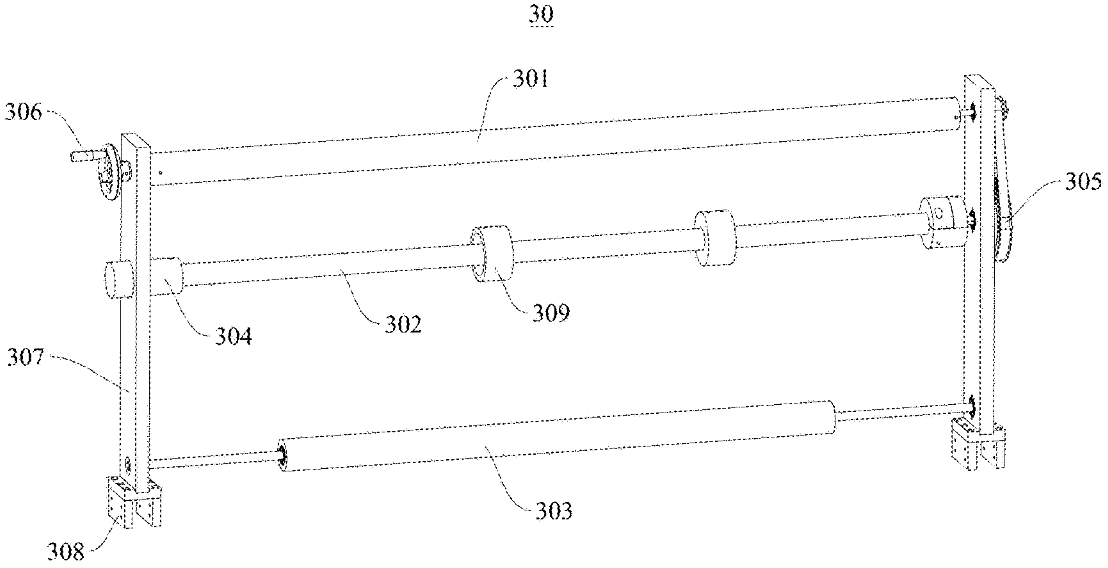
FIG. 4 is a schematic view of the structure of the conveying roller cleaning device provided in some embodiments of the present disclosure.

Referring to FIG. 4, FIG. 4 is a schematic view of the structure of the conveying roller cleaning device 30 provided in some embodiments of the present disclosure. The embodiments of the present disclosure also provide a conveying roller cleaning device 30, which includes a support 307, an unwinding reel 302, and a winding reel 301, wherein the unwinding reel 302 is rotatably arranged on the support 307 and is configured to unwind the adhesive tape 80 wound on the unwinding reel; the winding reel 301 is rotatably arranged on the support 307 and is configured to wind the release film 803 separated from the adhesive tape 80; and the unwinding reel 302 and the winding reel 301 are provided parallel to each other.

The support 307 is an installation component used to fix the unwinding reel 302 and the winding reel 301.

A limit member can be provided on the unwinding reel 302 and the winding reel 301 to limit the position of the roll of adhesive tape 80 on the unwinding reel 302 relative to the unwinding reel 302, and limit the position of the roll of the release film 803 on the winding reel 301 relative to the winding reel 301. The limit member can be a limiting ring 309 sleeved on the outer peripheral surface of the unwinding reel 302 or the winding reel 301.

For the convenience of storage and transportation, the adhesive tape 80 is usually wound into a cylindrical roll of adhesive tape 80. The roll of adhesive tape 80 is arranged on the unwinding reel 302, and under the action of the traction force of the material tape 70, the roll of adhesive tape 80 rotates and unwinds the adhesive tape 80 successively for easy use. When the adhesive tape 80 is used, it is necessary to remove the release film 803. To prevent the release film 803 from scattering, polluting the production environment, or resulting in safety hazards, the removed release film 803 is wound around the winding reel 301 for easy cleaning and recycling, which can reduce costs and protect the environment.

The parallel arrangement between the unwinding reel 302 and the winding reel 301 can provide protection for both the release film 803 and the adhesive tape 80. Specifically, when winding the release film 803, if the unwinding reel 302 and the winding reel 301 are not in a parallel state, the tension on one side of the release film 803 will be greater than that on the other side, thereby increasing the risk of breakage of the release film 803. Correspondingly, due to the uneven force on the release film 803, the release film 803 will generate tension on the adhesive tape 80 wound on the unwinding reel 302, thereby causing the adhesive tape 80 to have a tendency to move axially along the unwinding reel 302. On the one hand, it may cause a change in the position of the adhesive tape 80 relative to the conveying roller 20, thereby making it impossible for the adhesive tape 80 to fully adhere to the conveying roller 20. On the other hand, there may be a deviation in the relative position between the adhesive tape 80 and the conveying roller 20, and the uneven traction force of material tape 70 on adhesive tape 80 can also cause a risk of breakage of adhesive tape 80.

Optionally, a fixing member can be installed on the support 307 to connect the support 307 to other devices. The fixing member can include two clamping blocks 308, and a clamping area is formed between the two clamping blocks 308. The purpose of fixing the support 307 is achieved by clamping other devices between the two clamping blocks 308. Furthermore, through holes can be provided on the fixing block for the bolts to pass through.

Figure 5:
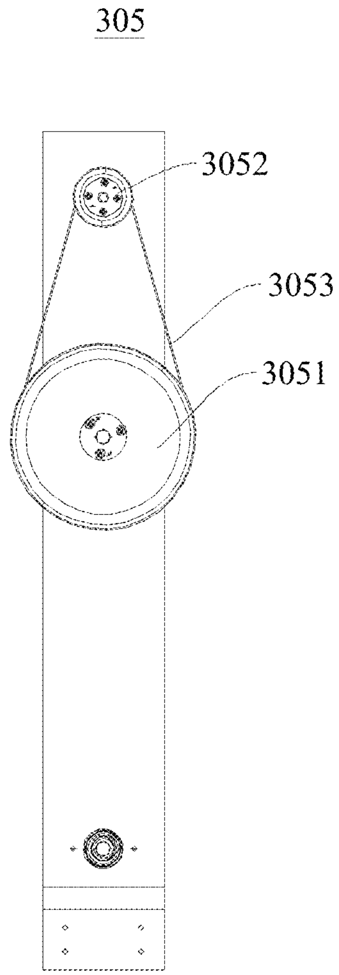
FIG. 5 is a schematic view of the structure of the transmission mechanism provided in some embodiments of the present disclosure.

Referring to FIG. 5, FIG. 5 is a schematic view of the structure of the transmission mechanism 305 provided in some embodiments of the present disclosure. In some embodiments, the conveying roller cleaning device 30 further includes a transmission mechanism 305, connecting an unwinding reel 302 and a winding reel 301.

To achieve the purpose of winding the release film 803, the winding reel 301 needs to rotate when unwinding the adhesive tape 80.

Although the adhesive tape 80 wound on the unwinding reel 302 can be unwinded under the action of traction, this can cause excessive force on the adhesive tape 80. Therefore, the transmission mechanism 305 drives the unwinding reel 302 to rotate, such that the adhesive tape 80 is gradually unwinded while being pulled, thereby reducing the tension on the adhesive tape 80 and reducing the risk of breakage of the adhesive tape 80.

The unwinding reel 302 and the winding reel 301 can rotate together under the action of the transmission mechanism 305, that is, while the unwinding reel 302 continuously unwinds the adhesive tape 80, the winding reel 301 can continuously wind the release film 803, thereby improving cleaning efficiency.

Furthermore, both the winding reel 301 and the unwinding reel 302 are driven by a transmission mechanism 305 to simplify the structure of the cleaning device and improve reliability of the cleaning device.

Please continue to refer to FIG. 5. In some embodiments, the transmission mechanism 305 includes: a first belt pulley 3051, a second belt pulley 3052, and a conveyor belt 3053, wherein the first belt pulley 3051 is connected to the unwinding reel 302; the second belt pulley 3052 is connected to the winding reel 301, and the diameter of the first belt pulley 3051 is greater than that of the second belt pulley 3052; and the conveyor belt 3053 is wound around the outer peripheral surfaces of the first belt pulley 3051 and the second belt pulley 3052.

The first belt pulley 3051 is connected to the unwinding reel 302 through transmission, that is, the positions of the first belt pulley 3051 and the unwinding reel 302 are relatively fixed. When the first belt pulley 3051 rotates, the unwinding reel 302 rotates together.

The second belt pulley 3052 is connected to the winding reel 301 through transmission, that is, the positions of the second belt pulley 3052 and the winding reel 301 are relatively fixed. When the second belt pulley 3052 rotates, the winding reel 301 rotates together.

The conveyor belt 3053 enables the torque between the first belt pulley 3051 and the second belt pulley 3052 to be transmitted to each other, that is, when driving either of the first belt pulley 3051 and the second belt pulley 3052 to rotate, the other can rotate synchronously. Therefore, the transmission connection between the unwinding reel 302 and the winding reel 301 can be achieved. Furthermore, since the conveyor belt 3053 transmits power through friction, when the transmission mechanism 305 experiences overload, relative sliding occurs between the conveyor belt 3053 and two belt pulleys, thereby providing overload protection.

When unwinding adhesive tape 80 and winding release film 803, the movement speed of adhesive tape 80 and the movement speed of release film 803 can be considered equal. If the radius of the roll of release film 803 is R1, the angular speed of rotation of release film 803 is W1, the radius of the roll of adhesive tape 80 is R2, and the angular speed of rotation of the roll of adhesive tape 80 is W2, R1*W1=R2*W2, because R2 is greater than R1, W1 should be greater than W2. In other words, the diameter of the first belt pulley 3051 should be greater than the diameter of the second belt pulley 3052.

Please continue to refer to FIG. 4. In some embodiments, the conveying roller cleaning device 30 further includes an operating part 306, which is arranged at one end of the winding reel 301 to drive the winding reel 301 to rotate.

The operating part 306 can serve as a handle to drive the winding reel 301 to rotate by shaking the handle.

The unwinding reel 302 can actively rotate under the action of the traction force of the material tape 70. At this time, the winding reel 301 can coil the release film 803. However, as the adhesive tape 80 continues to be unwinded, the radius R2 of the roll of adhesive tape 80 gradually decreases, and the radius R1 of the roll of release film 803 gradually increases. From the equation R1*W1=R2*W2, it can be seen that R2/R1=W1/W2, R2/R1 gradually decreases, and W1/W2 also gradually decreases. Therefore, the winding reel 301 may not be able to immediately coil the released release film 803. At this point, the operating part 306 can increase the rotating speed of the winding reel 301, so that the release film 803 can be wound tightly on the winding reel 301.

Please continue to refer to FIG. 4. In some embodiments, the conveying roller cleaning device 30 further includes a damper 304, and the unwinding reel 302 is rotatably connected to the support 307 through the damper 304.

The damper 304 provides resistance during the rotation of the unwinding reel 302. The structure, installation method, and working principle of the damper 304 are contents disclosed in the prior art and will not be elaborated here.

On the one hand, the damper 304 prevents the roll of adhesive tape 80 from rotating too fast under the action of inertia during the unwinding process, which results in excessive unwinding of the adhesive tape 80 or vibration. On the other hand, due to the soft texture of adhesive tape 80, one way to prevent the adhesive tape 80 from being sluggish is to provide support for adhesive tape 80, but this method will increase costs and increase the space occupied by the equipment. Another way is to maintain a certain tension on adhesive tape 80 to keep it tightened, while the resistance provided by damper 304 allows the unwinded adhesive tape 80 to be tightened to prevent adhesive tape 80 from being sluggish. Furthermore, when the adhesive tape 80 is sluggish, it is inconvenient to guide the adhesive tape 80 and make it turn. Tightening the adhesive tape 80 is convenient for guiding it.

Please continue to refer to FIG. 4. In some embodiments, the conveying roller cleaning device 30 further includes a guide roller 303, which is rotatably arranged on a support 307 to change the direction of movement of the adhesive tape 80, and the guide roller 303 is parallel to the unwinding reel 302.

After the adhesive tape 80 is released from the unwinding reel 302, it is directed towards the guide roller 303. With the support by the guide roller 303, the adhesive tape 80 can be bent in a tightened state, thereby achieving the purpose of guiding the adhesive tape 80.

The guide roller 303 can guide the unwinded adhesive tape 80, thereby allowing it to move along the set trajectory. Furthermore, due to the parallel arrangement between the guide roller 303 and the unwinding reel 302, the adhesive tape 80 can be in a flat state during movement.

When the adhesive tape 80 is pulled to move, within a certain length range, the adhesive tape 80 can be seen as a plane. To ensure that adhesive tape 80 can be evenly supported, the unwinding reel 302 and guide roller 303 should be parallel to the plane of adhesive tape 80, and the guide roller 303 should be parallel to the unwinding reel 302. Otherwise, the guide roller 303 can only partially contact the adhesive tape 80, which leads to uneven force on adhesive tape 80.

Please continue to refer to FIG. 4. In some embodiments, the unwinding reel 302 is located between the guide roller 303 and the winding reel 301.

When unwinding, as the adhesive tape 80 moves towards the guide roller 303 and the release film 803 moves towards the winding roller, the relative positions between the unwinding reel 302, guide roller 303, and winding reel 301 determine the direction of movement of the adhesive tape 80 and release film 803.

The unwinding reel 302 is located between the guide roller 303 and the winding reel 301, so that the movement paths of the adhesive tape 80 and the release film 803 do not intersect, thereby avoiding interference between the adhesive tape 80 and the release film 803.

Figure 6:
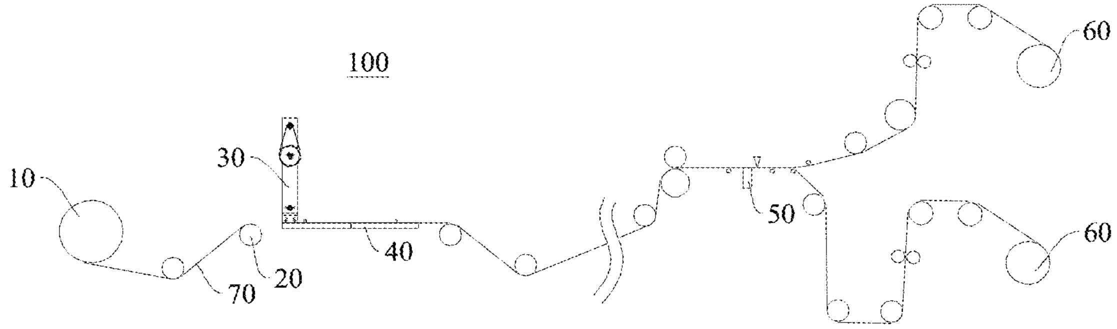
FIG. 6 is a schematic view of the structure of the material tape conveying equipment provided in some embodiments of the present disclosure.
Figure 7:
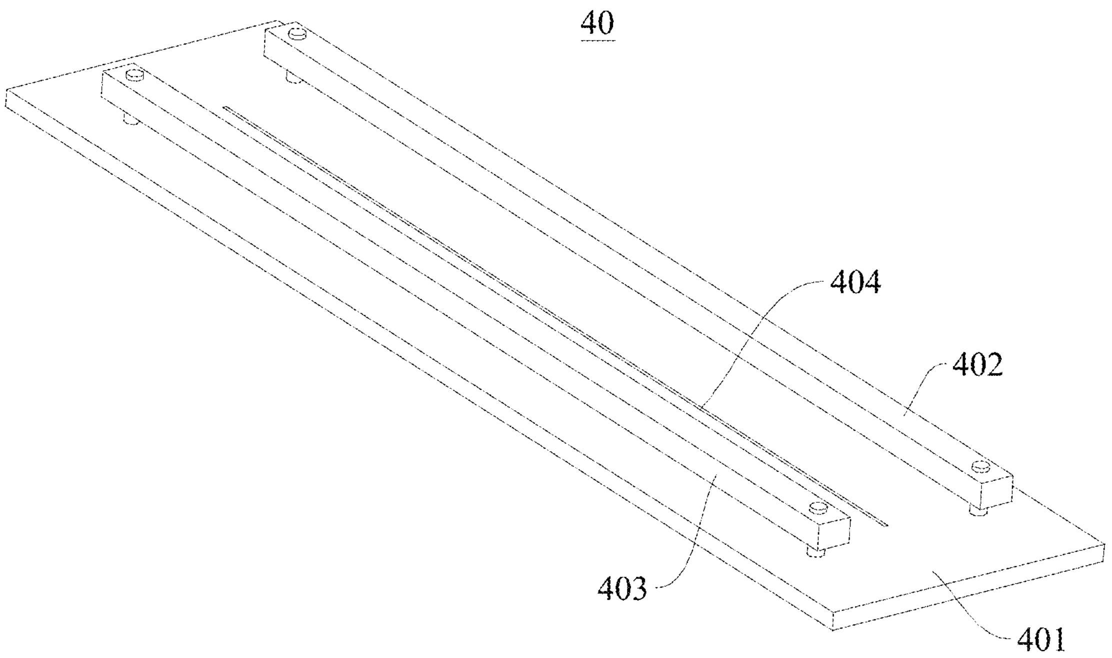
FIG. 7 is a schematic view of the structure of the tape connecting platform provided in some embodiments of the present disclosure.

Referring to FIGS. 6 and 7, FIG. 6 is a schematic view of the structure of the material tape conveying equipment 100 provided in some embodiments of the present disclosure; and FIG. 7 is a schematic view of the structure of the tape connecting platform 40 provided in some embodiments of the present disclosure. The embodiment of the present disclosure also provides a material tape conveying equipment 100, including a tape connecting platform 40, a conveying roller cleaning device 30 in the above embodiment, and multiple conveying rollers 20, wherein the multiple conveying rollers 20 are configured to convey the material tape 70; the tape connecting platform 40 is configured to achieve the connection between two segments of the material tape 70, wherein along the conveying direction of the material tape 70, the tape connecting platform 40 is arranged upstream of the multiple conveying rollers 20; and the conveying roller cleaning device 30 is provided on the tape connecting platform 40.

The multiple conveying rollers 20 are arranged according to a certain plan in the space, thereby forming a conveying route for material tape 70.

The tape connecting platform 40 is located upstream of multiple conveying rollers 20, and the conveying roller cleaning device 30 is located on the tape connecting platform 40. The conveying roller 20 closest to the tape connecting platform 40 is the first conveying roller 20 in the conveying direction among the multiple conveying rollers 20. This arrangement enables all conveying rollers 20 to be cleaned by the adhesive tape 80.

The tape connecting platform 40 can include a support surface 401, a first pressing rod 402, and a second pressing rod 403. The first pressing rod 402 and the second pressing rod 403 are arranged on the support surface 401, and there is a gap respectively between the first pressing rod 402 and the support surface 401 and between the second pressing rod 403 and the support surface 401, which is used to make the adhesive tape 80 or the material tape 70 pass through. The first pressing rod 402 and the second pressing rod 403 play a guiding and limiting role on the adhesive tape 80 or the material tape 70, so that the end portion of the adhesive tape 80 or the material tape 70 to be connected can be between the first pressing rod 402 and the second pressing rod 403. The support surface 401 is provided thereon with a cutting seam 404. When cutting the material tape 70 or adhesive tape 80 with a cutting tool, the material tape 70 or adhesive tape 80 is covered over the cutting seam 404, and the cutting tool passes through the material tape 70 or adhesive tape 80 and is inserted into the cutting seam 404, thereby allowing the material tape 70 or adhesive tape 80 to be cut.

The multiple conveying rollers 20 form a conveying route to achieve the purpose of conveying the material tape 70. The tape connecting platform 40 can be used to connect different segments of the material tape 70, and also can be used to connect the material tape 70 with the adhesive tape 80, thereby enabling the material tape conveying equipment 100 to switch between conveying condition and cleaning condition.

Please continue to refer to FIG. 6. In some embodiments, the material tape conveying equipment 100 further includes an unwinding mechanism 10 and a winding mechanism 60, wherein the unwinding mechanism 10 is configured to unwind the material tape 70 and the winding mechanism 60 is configured to wind the material tape 70, wherein along the conveying direction of the material tape 70, the winding mechanism 60 is arranged downstream of the unwinding mechanism 10, and the tape connecting platform 40 and multiple conveying rollers 20 are provided between the unwinding mechanism 10 and the winding mechanism 60.

The unwinding mechanism 10 can include an unwinding roller, the winding mechanism 60 can include a winding roller, the material tape 70 to be conveyed is wound around the unwinding roller, and the material tape 70 conveyed to the end is wound around the winding roller.

The winding mechanism 60 provides the power to pull the material tape 70 to move, thereby allowing the material tape 70 to pull the adhesive tape 80 to move.

Furthermore, other processing equipment can be installed between the unwinding mechanism 10 and the winding mechanism 60, which can be combined with the material tape conveying equipment 100 to form a processing assembly line, thereby improving production efficiency.

Please refer to FIGS. 4-6. The embodiment of the present disclosure also provides a material tape conveying equipment 100, which includes an unwinding mechanism 10, two winding mechanisms 60, a tape connecting platform 40, a conveying roller cleaning device 30, a cutting device 50, and multiple conveying rollers 20. The tape connecting platform 40, the cutting device 50, and multiple conveying rollers 20 are arranged between the unwinding mechanism 10 and the winding mechanism 60. Along the conveying direction of the material tape 70, the tape connecting platform 40 is arranged upstream of the multiple conveying rollers 20.

The multiple conveying rollers 20 are provided at intervals to form a conveying route.

The conveying roller cleaning device 30 includes a support 307, an unwinding reel 302, a winding reel 301, and a guide roller 303. The support 307 includes two supporting components, and the two ends of the winding reel 301 are rotatably arranged on the support 307 through two first bearings, for winding the release film 803 separated from the adhesive tape 80. The two ends of the guide roller 303 are rotatably arranged on the support 307 through two second bearings. The two ends of the unwinding reel 302 are rotatably arranged on the support 307 through two dampers 304, and the unwinding reel 302 is used to unwind the adhesive tape 80 wound on it. The damper 304 is a magnetic damper, which includes an installation part and a rotating part. The installation part is connected to the supporting component, and the unwinding reel 302 is connected to the rotating part. The unwinding reel 302, winding reel 301, and guide roller 303 are arranged in parallel to each other.

One of the supporting components is rotationally provided with a handle, which is connected coaxially to the winding reel 301. The handle is rotated to drive the winding reel 301 to rotate.

The support 307 is connected to the tape connecting platform 40 through a fixing member, which includes two clamping blocks 308. A clamping area is formed between the two clamping blocks 308, and the connection part between the tape connecting platform 40 and the support 307 is arranged between the two clamping blocks 308 to connect the support 307 to the tape connecting platform 40. The clamping blocks 308 are in one-to-one correspondence to two supporting components. A first through hole is provided at the connection part between the tape connecting platform 40 and the support 307, and a second through hole is provided at the clamping block 308. After the bolt passes through the first through hole and the second through hole, it is connected to the nut to make the clamping block 308 fixed on the tape connecting platform 40.

The cutting device 50 is used to cut the material tape 70 into two segments along its length direction, and the cut material tape 70 is wound on two winding mechanisms 60 in one-to-one correspondence.

The above is only preferred embodiments of the present disclosure and is not intended to limit it. For those skilled in the art, the present disclosure may undergo various modifications and variations. Any modifications, equivalent replacements, improvements, etc. made within the spirit and principles of the present disclosure shall be included within the scope of protection of the present disclosure.

What is claimed is:

1. A material tape conveying equipment, comprising:

multiple conveying rollers, configured to convey a material tape;

a tape connecting platform, configured to achieve a connection between two segments of the material tape, wherein along a conveying direction of the material tape, the tape connecting platform is arranged upstream of the multiple conveying rollers; and a conveying roller cleaning device, wherein the conveying roller cleaning device is arranged at the tape connecting platform, and the conveying roller cleaning device comprises:

a support;

an unwinding reel, rotatably arranged on the support and configured to unwind an adhesive tape wound on the unwinding reel; and a winding reel, rotatably arranged on the support and configured to wind a release film separated from the adhesive tape, wherein the unwinding reel and the winding reel are arranged in parallel to each other.

2. The material tape conveying equipment according to claim 1, wherein the conveying roller cleaning device further comprises:

a transmission structure, connecting the unwinding reel and the winding reel.

3. The material tape conveying equipment according to claim 2, wherein the transmission structure comprises:

a first belt pulley, connected to the unwinding reel;

a second belt pulley, connected to the winding reel, wherein a diameter of the first belt pulley is larger than that of the second belt pulley; and a conveyor belt, wound around outer peripheral surfaces of the first belt pulley and the second belt pulley.

4. The material tape conveying equipment according to claim 2, wherein the conveying roller cleaning device further comprises an operating structure, wherein the operating structure is arranged at one end of the winding reel to drive the winding reel to rotate.

5. The material tape conveying equipment according to claim 1, wherein the conveying roller cleaning device further comprises an operating structure, wherein the operating structure is arranged at one end of the winding reel to drive the winding reel to rotate.

6. The material tape conveying equipment according to claim 1, wherein the conveying roller cleaning device further comprises a damper, wherein the unwinding reel is rotatably connected to the support through the damper.

7. The material tape conveying equipment according to claim 1, wherein the conveying roller cleaning device further comprises a guide roller, wherein the guide roller is rotatably arranged on the support to change a direction of movement of the adhesive tape, and the guide roller is parallel to the unwinding reel.

8. The material tape conveying equipment according to claim 7, wherein the unwinding reel is located between the guide roller and the winding reel.

9. The material tape conveying equipment according to claim 7, wherein the material tape conveying equipment further comprises:

an unwinding structure, configured to unwind the material tape; and a winding structure, configured to wind the material tape, wherein along the conveying direction of the material tape, the winding structure is arranged downstream of the unwinding structure, and the tape connecting platform and the multiple conveying rollers are provided between the unwinding structure and the winding structure.

* * * * *